United States Patent
Juitt et al.

(10) Patent No.: US 7,042,988 B2
(45) Date of Patent: May 9, 2006

(54) METHOD AND SYSTEM FOR MANAGING DATA TRAFFIC IN WIRELESS NETWORKS

(75) Inventors: David Juitt, Arlington, MA (US); Philip Bates, London (GB); Thomas Christoffel, Concord, MA (US); Geoffrey Crawshaw, Needham, MA (US); David Crosbie, Somerville, MA (US)

(73) Assignee: Bluesocket, Inc., Burlington, MA (US)

( * ) Notice: Subject to any disclaimer, the term of this patent is extended or adjusted under 35 U.S.C. 154(b) by 512 days.

(21) Appl. No.: 10/259,248

(22) Filed: Sep. 27, 2002

(65) Prior Publication Data

US 2003/0087629 A1 May 8, 2003

Related U.S. Application Data

(60) Provisional application No. 60/325,592, filed on Sep. 28, 2001.

(51) Int. Cl.
*H04M 1/64* (2006.01)

(52) U.S. Cl. .................. 379/88.17; 370/329; 455/411; 455/456.3; 726/12

(58) Field of Classification Search ................ 455/412, 455/414.1, 413, 415
See application file for complete search history.

(56) References Cited

U.S. PATENT DOCUMENTS

| | | | |
|---|---|---|---|
| 5,239,466 A | 8/1993 | Morgan et al. | |
| 5,301,356 A | 4/1994 | Bodin et al. | |
| 5,423,065 A | 6/1995 | Pinard | 455/33.2 |
| 5,457,680 A | 10/1995 | Kamm et al. | |
| 5,629,981 A | 5/1997 | Nerlikar | |
| 5,657,317 A | 8/1997 | Mahany et al. | |
| 5,668,875 A | 9/1997 | Brown et al. | |
| 5,673,031 A | 9/1997 | Meier | |
| 5,809,415 A | 9/1998 | Rossmann | 455/422 |
| 5,889,942 A | 3/1999 | Orenshteyn | |
| 5,901,144 A | 5/1999 | Maki et al. | 370/330 |
| 5,915,008 A | 6/1999 | Dulman | |

(Continued)

FOREIGN PATENT DOCUMENTS

EP 0 504 122 A2 9/1992

(Continued)

OTHER PUBLICATIONS

Crosbie, "Method and System for Enabling Seamless Roaming in a Wireless Network," Mar. 21, 2002.*

(Continued)

*Primary Examiner*—Allan Hoosain
*Assistant Examiner*—Gerald Gauthier
(74) *Attorney, Agent, or Firm*—Goodwin Procter, LLP

(57) ABSTRACT

The present invention can be used to facilitate the integration of wireless capability provided by wireless access points into an enterprise computer network. A gateway server is interposed between wireless access points and protected networks to provide security and integration functions, for example, authentication, access control, link privacy, link integrity, and bandwidth metering in various embodiments. Use of such a gateway server allows substantial control to be gained over network access even with the use of relatively simple access points. In general, such a gateway server receives a request to access the protected network. An authentication subsystem of the gateway server authenticates the user, preferably by accessing an external authentication server and returns a role to the authenticated user. An access controller in the gateway server provides differential access to the protected network based on the user's assigned role. A multiple gateway servers can be connected together to form a mesh network architecture.

52 Claims, 10 Drawing Sheets

U.S. PATENT DOCUMENTS

| | | | |
|---|---|---|---|
| 5,940,591 A | 8/1999 | Boyle et al. | 395/187.01 |
| 5,949,776 A | 9/1999 | Mahany et al. | |
| 5,953,507 A | 9/1999 | Cheung et al. | |
| 5,987,062 A | 11/1999 | Engwer et al. | 375/225 |
| 6,014,558 A | 1/2000 | Thomas | 455/410 |
| 6,018,657 A | 1/2000 | Kennedy, III et al. | 455/426 |
| 6,026,297 A | 2/2000 | Haartsen | 455/426 |
| 6,038,458 A | 3/2000 | Siira | 455/560 |
| 6,044,401 A | 3/2000 | Harvey | |
| 6,044,465 A | 3/2000 | Dutcher et al. | |
| 6,055,236 A | 4/2000 | Nessett et al. | |
| 6,073,234 A | 6/2000 | Kigo et al. | |
| 6,081,900 A | 6/2000 | Subramaniam et al. | 713/201 |
| 6,115,390 A | 9/2000 | Chuah | |
| 6,115,615 A | 9/2000 | Ota et al. | 455/553 |
| 6,134,591 A | 10/2000 | Nickles | 709/229 |
| 6,137,791 A | 10/2000 | Frid et al. | 370/352 |
| 6,141,690 A | 10/2000 | Weiman | |
| 6,151,628 A * | 11/2000 | Xu et al. | 709/225 |
| 6,172,986 B1 | 1/2001 | Watanuki et al. | 370/466 |
| 6,182,076 B1 * | 1/2001 | Yu et al. | 707/10 |
| 6,192,130 B1 | 2/2001 | Otway | |
| 6,195,705 B1 | 2/2001 | Leung | 709/245 |
| 6,205,480 B1 * | 3/2001 | Broadhurst et al. | 709/225 |
| 6,223,291 B1 | 4/2001 | Puhl et al. | |
| 6,233,577 B1 | 5/2001 | Ramasubramani et al. | |
| 6,243,581 B1 | 6/2001 | Jawanda | 455/432 |
| 6,256,300 B1 | 7/2001 | Ahmed et al. | |
| 6,256,737 B1 | 7/2001 | Bianco et al. | |
| 6,292,657 B1 | 9/2001 | Laursen et al. | |
| 6,301,471 B1 | 10/2001 | Dahm et al. | |
| 6,377,548 B1 | 4/2002 | Chuah | 370/233 |
| 6,427,174 B1 | 7/2002 | Sitaraman et al. | 709/245 |
| 6,493,749 B1 | 12/2002 | Paxhia et al. | 709/220 |
| 6,594,484 B1 | 7/2003 | Hitchings, Jr. | |
| 6,600,734 B1 | 7/2003 | Gernert et al. | |
| 6,633,761 B1 | 10/2003 | Singhal et al. | 455/436 |
| 6,769,009 B1 | 7/2004 | Reisman et al. | |
| 6,772,331 B1 | 8/2004 | Hind et al. | |
| 2001/0001268 A1 | 5/2001 | Menon et al. | 370/329 |
| 2001/0012777 A1 | 8/2001 | Igarashi et al. | 455/435 |
| 2001/0014917 A1 | 8/2001 | Ishiyama et al. | 709/227 |
| 2001/0016492 A1 | 8/2001 | Igarashi et al. | 455/433 |
| 2001/0017856 A1 | 8/2001 | Asokan et al. | 370/389 |
| 2001/0020241 A1 | 9/2001 | Kawamoto et al. | 707/202 |
| 2001/0023446 A1 | 9/2001 | Balogh | 709/229 |
| 2001/0024443 A1 | 9/2001 | Alriksson et al. | 370/401 |
| 2001/0031634 A1 | 10/2001 | Mizutani et al. | 455/425 |
| 2001/0036224 A1 | 11/2001 | Demello et al. | 375/220 |
| 2001/0043571 A1 | 11/2001 | Jang et al. | |
| 2001/0044305 A1 | 11/2001 | Reddy et al. | 455/436 |
| 2001/0048686 A1 | 12/2001 | Takeda et al. | 370/401 |
| 2002/0010758 A1 | 1/2002 | Chan | 709/218 |
| 2002/0013831 A1 | 1/2002 | Astala et al. | 709/220 |
| 2002/0032855 A1 | 3/2002 | Neves et al. | 713/154 |
| 2002/0032858 A1 | 3/2002 | Nakano et al. | 713/155 |
| 2002/0034298 A1 | 3/2002 | Gallagher et al. | 380/247 |
| 2002/0034301 A1 | 3/2002 | Andersson | 380/270 |
| 2002/0035699 A1 | 3/2002 | Crosbie | 713/201 |
| 2002/0037708 A1 | 3/2002 | McCann et al. | 455/411 |
| 2002/0046179 A1 | 4/2002 | Kokudo | 705/51 |
| 2002/0046285 A1 | 4/2002 | Yasushi et al. | 709/228 |
| 2002/0052965 A1 | 5/2002 | Dowling | 709/230 |
| 2002/0066029 A1 | 5/2002 | Yi | 713/201 |
| 2002/0066032 A1 | 5/2002 | Kurumida | 713/201 |
| 2002/0066036 A1 | 5/2002 | Makineni et al. | 713/201 |
| 2002/0069278 A1 | 6/2002 | Forslow | 709/225 |
| 2002/0069282 A1 | 6/2002 | Reisman | |
| 2002/0073240 A1 | 6/2002 | Kokkinen et al. | 709/249 |
| 2002/0075844 A1 | 6/2002 | Hagen | 370/351 |
| 2002/0085719 A1 | 7/2002 | Crosbie | |
| 2002/0087335 A1 | 7/2002 | Meyers et al. | 705/1 |
| 2002/0098840 A1 | 7/2002 | Hanson et al. | 455/435 |
| 2002/0101848 A1 | 8/2002 | Lee et al. | 370/349 |
| 2002/0114303 A1 | 8/2002 | Crosbie et al. | |
| 2002/0124109 A1 | 9/2002 | Brown | |
| 2002/0129094 A1 | 9/2002 | Reisman | |
| 2002/0136226 A1 | 9/2002 | Christoffel et al. | |
| 2002/0138620 A1 | 9/2002 | Brown | |
| 2002/0144144 A1 * | 10/2002 | Weiss et al. | |
| 2003/0035388 A1 * | 2/2003 | Schmidt | |
| 2003/0154110 A1 | 8/2003 | Walter et al. | |
| 2004/0167984 A1 | 8/2004 | Hermann | |
| 2004/0193921 A1 * | 9/2004 | Byrne | |

FOREIGN PATENT DOCUMENTS

| | | |
|---|---|---|
| EP | 0 883 266 A2 | 12/1998 |
| EP | 0 903 873 A1 | 3/1999 |
| EP | 0 964 599 A2 | 12/1999 |
| EP | 0 982 662 A2 | 3/2000 |
| EP | 0 984 639 A2 | 3/2000 |
| EP | 1 009 176 A2 | 6/2000 |
| EP | 1 011 243 A1 | 6/2000 |
| EP | 1 011 278 A2 | 6/2000 |
| JP | 1 131 7744 | 11/1999 |
| WO | WO 00/36522 | 6/2000 |
| WO | WO 00/79727 | 12/2000 |
| WO | WO 01/19097 | 3/2001 |
| WO | WO 01/50781 A2 | 7/2001 |
| WO | WO 02/09458 A2 | 1/2002 |
| WO | WO 02/41587 A2 | 5/2002 |
| WO | WO 02/065707 A2 | 8/2002 |
| WO | PCT/US02/08986 | 10/2002 |

OTHER PUBLICATIONS

Berger, S., et al., "Pervasive Networking Using Bluetooth: A Status Report and Future Plans," *Presentation Slides and Paper* (21 pgs.); IBM Watson Research Center (1999).

Bluesocket Press Release "Bluesocket Secures 5M in First-Round Funding from St. Paul Venture Capital and Osborn Capital LLC", (2 pages) [online], [Retrieved on Nov. 19, 2002)]. *Retrieved from the Internet:* <URL:http://www.bluesocket.com/news/funding.html>.

Bluetooth Specification Version 1.1, *Part K:9: Lan Access Profile:* 275-308 (2001).

Bluetooth Specification Version 1.1, *Section 10.9 Scatternet:* 120-123 (2001).

Bluetooth Specification Version 1.1, *Part C: Link Manager Protocol:* 184-252 (2001).

Bluetooth Specification Version 1.1, *Part H:1: Host Controller Interface Functional Specification:* 536-780 (2001).

Bluetooth Specification Version 1.1, *Part H:2: HCI USB Transport Layer:* 782-796 (2001).

Bluetooth Specification Version 1.1, *Part H:3: HCI RS232 Transport Layer:* 798-818 (2001).

Bluetooth Specification Version 1.1, *Part H:4: HCI UART Transport Layer:* 820-826 (2001).

Bray et al., "Bluetooth—Connect Without Cables", (New Jersey, Prentice Hall, Mar. 20, 2001), XP002221666, p. 84, ¶5.7-p. 86, ¶5.8.

Bray et al., "Bluetooth—Connect Without Cables", (New Jersey, Prentice Hall, Mar. 20, 2001), XP002221667, p. 115-118.

"PSDN Solution for CDMA2000 Networks," (2 pgs.) [online], [Retrieved on Jan. 25, 2002]. *Retrieved from the Internet:* <URL:http://www.cisco.com/warp/public/779/servpro/solutions/wireless_mobile/pdsn.html>.

Cisco White Paper, "Cisco Code-Division Multiple Access Performance Management", (15 pgs.) [online], [Retrieved on Jan. 25, 2002]. *Retrieved from the Internet:* <URL:http://www.cisco.com/warp/public/779/servpro/solutions/wireless_mobile/pdsn.html>.

ETSI HIPERLAN/2 standard [online], Sep. 2000, (3 pgs.) [online], [Retrieved on Jul. 16, 2001]. *Retrieved from the Internet:* <URL:http://www.etsi.org/technicalactiv/hiperlan2.htm>.

Haartsen, J., "Bluetooth—The universal radio interface for *ad hoc,* wireless connectivity", *Ericsson Review* No. 3, pp. 110-117, 1998, XP000783249 ISSN:0014-0171.

Lough et al., "A Short Tutorial on Wireless LANs and IEEE 802.11", (5 pgs.) [online], [Retrieved on Oct. 16, 2001]. *Retrieved from the Internet:* <URL:http://www.computer.org/students/looking/summer97/ieee802.htm>.

"Medium Access Control (MAC) and Physical (PHY) Specifications," *MAC Sublayer Management Entity:* 123-128, ANSI/IEEE Std 802.11 (1999).

Mitzel, D., "Overview of 2000 IAB Wireless Internetworking Workshop", (40 pgs.) [online], Dec., 2000 [Retrieved on Jan. 25, 2002]. *Retrieved from the Internet:* <URL:http://www.ietf.org/rfc/rfc3002.txt?number=3002>.

Mouly et al., "GSM—The System for Mobile Communications" (Palaiseau, France, Sep. 2, 1993), XP002221665, p. 327-330.

T. Muller, "Bluetooth White Paper", *Bluetooth Security Architecture Version 1.0:* 1-33 (1999).

Perkins, C., "IP Mobility Support", (67 pgs.) [online], Oct., 1996 [Retrieved on Sep. 16, 2002]. *Retrieved from the Internet:* <URL:http://www.ietf.org/rfc/rfc2002.txt?number=2002>.

"A Practical Approach to Identifying and Tracking Unauthorized 802.11 Cards and Access Points", (26 pgs.) [online], [Retrieved on Sep. 10, 2001]. *Retrieved from the Internet:* <URL:http://www.interlinknetworks.com/graphics/news/wireless_detection_and_tracking.pdf>.

"RoamAD" (6 pgs.) [online], [Retrieved on Sep. 16, 2002]. *Retrieved from the Internet:* <URL:http://www.roamad.com/roam>.

R. Schneiderman, "Bluetooth's slow dawn: Hype gives way to hard work as expectations for the mini radio network encounter nettlesome interoperability issues," *IEEE Spectrum:* 61-65 (2000).

Solomon, J., "Applicability Statement for IP Mobility Support", (5 pgs.) [online], Oct., 1996 [Retrieved on Jan. 25, 2002]. *Retrieved from the Internet:* <URL:http://www.ietf.org/rfc/rfc2005.txt?number=2005>.

Townsley, W., et al., " Layer Two Tunneling Protocol 'L2TP'," [online], Aug., 1999 [Retrieved on Aug. 29, 2001]. *Retrieved from the Internet:* <URL:http://www.ietf.org/rfc/rfc2661.txt?number=2661>.

Vernier Networks Whitepaper, "Controlling the Network Edge: Vernier Networks and the Enterprise", (7 pgs.) [online], Jun., 2002 [Retrieve on Sep. 10, 2002]. *Retrieved from the Internet:* <URL:www.verniernetworks.com>.

Vernier Networks Whitepaper, "High Availability for Wireless Edge Connectivity", (6 pgs.) [online], Jun., 2002 [Retrieve on Sep. 10, 2002]. *Retrieved from the Internet:* <URL:www.verniernetworks.com>.

Vernier Networks Whitepaper, "The Vernier Networks System", (7 pgs.) [online], [Retrieve on Sep. 10, 2002]. *Retrieved from the Internet:* <URL:www.verniernetworks.com>.

Vernier Networks Whitepaper, "The Three Phases of WLAN Deployments", (2 pgs.) [online], Jun., 2002 [Retrieve on Sep. 10, 2002]. *Retrieved from the Internet:* <URL:www.verniernetworks.com>.

Vernier Networks Whitepaper, "Vernier Networks: Ensuring the Promise of 802.11b Networks", (5 pgs.) [online], Jun., 2002 [Retrieve on Sep. 10, 2002]. *Retrieved from the Internet:* <URL:www.verniernetworks.com>.

Vernier Networks Whitepaper, "Wireless Security: Protecting Your 802.11 Network", (3 pgs.) [online], Jun., 2002 [Retrieve on Sep. 10, 2002]. *Retrieved from the Internet:* <URL:www.verniernetworks.com>.

International Search Report for International Application No.: PCT/US01/23145, dated Aug. 16, 2002.

International Search Report for International Application No.: PCT/US02/08986, dated Aug. 19, 2002.

International Search Report for International Application No.: PCT/US01/51306, dated Dec. 3, 2002.

Bluetooth Specification Version 1.0 B, *10 Channel Control* (Nov. 29, 1999), pp. 95-126.

International Search Report for International Application No.: PCT/US01/49547, dated Feb. 28, 2003.

Office Action for U.S. Appl. No. 09/911,092 dated Sep. 19, 2005.

European Search Report for Application No. 02725322.8 dated Aug. 26, 2005.

International Search Report for International Application No.: PCT/US02/30558, dated Mar. 28, 2003.

* cited by examiner

| Name | | | | | |
|---|---|---|---|---|---|
| Engineering | | | | | |

Bandwidth
| 5 | Mbits/second ▶ |
|---|---|

VPN
| PPTP ▶ |
|---|

| Policy | Action | Service | Direction | Destination | Policy Management... |
|---|---|---|---|---|---|
| 1 | Deny ▶ | All ▶ | Both ways ▶ | Finance Server ▶ | ▶ |
| 2 | Allow ▶ | HTTP ▶ | Both ways ▶ | All ▶ | ▶ |
| 3 | Allow ▶ | HTTPS ▶ | Both ways ▶ | All ▶ | ▶ |
| 4 | Allow ▶ | SMTP ▶ | Outgoing ▶ | All ▶ | ▶ |
| 5 | Allow ▶ | POP-3 ▶ | Outgoing ▶ | All ▶ | ▶ |

Inherit from role
| Select ▶ |
|---|

FIG. 4

| Name | | | | |
|---|---|---|---|---|
| Staff | | | | |

Bandwidth: 5 Mbits/second ▸

VPN: PPTP ▸

| Policy | Action | Service | Direction | Destination | Policy Management ... |
|---|---|---|---|---|---|
| 1 | Allow ▸ | HTTP ▸ | Both ways ▸ | All ▸ | ▸ |
| 2 | Allow ▸ | HTTPS ▸ | Both ways ▸ | All ▸ | ▸ |
| 3 | Allow ▸ | SMTP ▸ | Outgoing ▸ | All ▸ | ▸ |
| 4 | Allow ▸ | POP-3 ▸ | Outgoing ▸ | All ▸ | ▸ |
| 5 | ▸ | ▸ | ▸ | | ▸ |

Inherit from role: Select ▸

FIG. 6

METHOD AND SYSTEM FOR MANAGING DATA TRAFFIC IN WIRELESS NETWORKS

CROSS-REFERENCE TO RELATED APPLICATION

This application claims priority to and the benefit of U.S. Provisional Patent Application Ser. No. 60/325,592, filed Sep. 28, 2001, entitled METHOD AND SYSTEM FOR MANAGING DATA TRAFFIC IN WIRELESS NETWORKS, the entire disclosure of which is hereby incorporated by reference.

TECHNICAL FIELD

This invention relates to the field of telecommunications and, more particularly, to the management of data traffic in wireless networks.

BACKGROUND INFORMATION

Wireless network technology allows a mobile user to wirelessly connect to a wired network, such as an enterprise's local area network (LAN) or wide area network (WAN), or to another wireless network. Enterprises today are rapidly deploying wireless technology, in part because of the decreasing cost of mobile devices (e.g., personal digital assistants like the Compaq iPAQ by Compaq Corporation of Houston, Tex. and laptop computers) and wireless access points, and in part because of the increasing ease of installation and deployment, among other reasons. Such wireless network technology can provide LAN and/or WAN service to enterprises' authorized users without wire installation and without tethering users to network connections. Wireless networks typically include mobile devices and wireless access points, which are portals to the wired network. Wireless access points are available with varying degrees of intelligence and functionality. Some merely act as bridges that relay wireless traffic into a wired network, while others provide additional functionality. Typically, simpler access points that provide less functionality cost less, but may not provide features necessary for operation within an enterprise.

Devices that conform to the IEEE 802.11 standard, a family of specifications for wireless networks developed by a working group of the Institute of Electrical and Electronics Engineers (IEEE), are very popular and, particularly, the 802.11b technology has garnered wide acceptance in many businesses as standard networking technology. This technology effectively replaces an Ethernet cable from a router to a computer with a wireless link. Each 802.11b access point can support dozens of mobile devices by sharing 11 Mbps (megabits per second) of capacity. There can be up to three access points working in the same area, and each typically has an indoor range of 80 feet at 11 Mbps and 300 feet at 1 Mbps.

Despite the freedom and convenience provided by wireless networks, establishment of adequate security is a barrier to adoption. Wireless networks introduce a series of new security problems to organizations because physical connection to a network is not required for access. Wireless network signals typically have ranges beyond the physical confines of a building. Any compatible network adapter or access point within the range of an 802.11b access point can join the network. Thus, these networks can potentially make otherwise proprietary resources available to unauthorized users.

To offset the susceptibility of wireless networks to unauthorized accesses, the 802.11b standard provides a security protocol called Wired Equivalent Privacy (WEP). WEP attempts to provide a wireless network with a level of security and privacy comparable to a wired network by providing access control, link privacy and data integrity functions. When WEP is enabled on an 802.11b network, a secure key is entered into each mobile device and this key is used to encrypt and authenticate data.

Many practitioners view the security provided by WEP as inadequate, however, and for many applications users typically implement additional security measures to supplement the deficiencies of WEP. For example, several independent studies have shown that, with relatively minor effort, attackers can gain access to a WEP-secured wireless network by eavesdropping on the network. The studies have also shown that attackers can log on to WEP-enabled networks as bona fide users and send data into the networks without being detected.

To overcome WEP's flaws, industry organizations have recommended using Virtual Private Networks (VPNs) to provide security for wireless networks. Unfortunately, the currently available VPNs introduce additional implementation challenges. For example, some implementations require access points to be directly wired to a single VPN server (normally located in a central equipment room). VPNs typically provide only binary access to the organization's network, meaning a mobile device user can either have a complete access to the protected network or none at all. Further, a single 11 Mbps 802.11b access point can have an effective throughput of approximately three times more than the capacity of a T1 connection, which is the connection typically supported by some existing VPN servers. Thus, wireless network users might overload the VPN server, resulting in poor performance for both the wireless network and mobile device users.

SUMMARY OF THE INVENTION

Systems and methods according to the invention can be used to facilitate the secure integration of wireless capability provided by wireless access points into an enterprise computer network. A gateway server is interposed between one or more wireless access points and protected (e.g., wired) networks. That gateway server provides security and integration functions, for example, authentication, access control, link privacy, link integrity, and bandwidth metering in various embodiments. Use of such a gateway server allows substantial control to be gained over network access even with the use of relatively simple (and inexpensive) access points. While the invention is particularly suited to the popular IEEE 802.11 wireless communication protocol, wireless access points are available that use a variety of present protocols, such as variations of 802.11 (e.g., 802.11a, 802.11b, 802.11g), Bluetooth, HiperLAN2, and 802.1x. The invention would be equally useful with other protocols and interfaces available now and in the future.

In one implementation, the present invention can address deficiencies in the WEP and VPN technologies by providing differential levels of access based on a category assigned to the user, rather than the binary configuration of according a user either full access to the organization's network or none at all. The present invention can limit the bandwidth capacity of users, for example, so the 11 Mbps of capacity at each 802.11b access point cannot easily be saturated by a single user, leaving all other users stalled.

In general, in one aspect, a gateway server receives a request to access the protected network. This request typically comes from a mobile device operated by a user. The request is communicated from the mobile device to a wireless access point, and relayed by the wireless access point to the gateway server. The request might be an explicit request for access, and can include an identifier and authentication information (e.g., a PIN, password, digital certificate, encryption key, digital code, or some combination). The request might be an implicit request, such as a request to access network resources, a web page request, and so on.

Since the gateway server manages access control and security in a single integrated configuration, neither the mobile device nor the access points need to be intelligent to carry out the sophisticated access control and security functions to connect with wireless networks. Moreover, any changes in the networks, mobile devices, and access points do not result in significant changes, such as additions, modifications, or replacements, to the gateway server. In one implementation, the gateway server can be configured by a web-based interface, so that configuration changes can be incorporated in the gateway server by merely changing the parameters using the web-based interface.

In some implementations, an authentication subsystem of the gateway server authenticates the user of the mobile device. This is preferably accomplished by accessing an external authentication server (e.g., a RADIUS, LDAP, or NTLM server). Enterprises typically use such servers in the operation of their networks. The use of an already operating external authentication server simplifies network administration. The gateway server (and/or the external authentication server) can also authenticate a user that was previously authenticated via the same or a different gateway server without requiring re-communication of authentication information. A user is free to roam between different access points in wireless networks without having to terminate open connections. In another embodiment, the user can be authenticated using an authentication database within the gateway server, instead of or in combination with accessing an external authentication server. Because the authentication process is conducted solely by the gateway server, use of an internal or external authentication server is irrelevant and transparent to the user.

In some implementations, after the authentication process, the authenticated user of the mobile device can establish a VPN connection with the gateway server according to the Point-to-Point Protocol (PPTP) or Internet Protocol Security (IPSec) protocol. The VPN connection can provide additional security measures for the user and the protected network.

In one embodiment, the gateway server can passively monitor an authentication process when a user makes a request to authenticate to a server. If the user successfully authenticates, the gateway server assigns a role to the user based on the server with which the user authenticated. In one example, the gateway server can easily integrate with Microsoft NT and/or Windows environment. A user already registered and authenticated in such environment does not need to authenticate separately to the gateway server, since the gateway server assigns the role when the NT and/or Windows server accepted the user.

In some implementations, the user can authenticate via a secure web page without requiring additional software. The use of a secure web page can protect the wireless network from illicit monitoring. The gateway server receives identifier and authentication information from the user through a secure web page. The identifier and authentication information might be associated with a user of the mobile device, the mobile device itself, a smart card, an authentication token, and so on. For purposes of this discussion, authenticating the mobile device is understood to include any one or a combination of suitable authentication techniques for authenticating a device and/or a user of a device, depending on implementation. Examples of an identifier include one or a combination of username, e-mail address, and unique name. Examples of authentication information include one or a combination of a personal identification number (PIN), password, digital certificate, encryption key, and digital code. As discussed above, the user can use the same identification and authentication information used to access the protected resource in the wired environment.

Additionally, the gateway server can detect unauthorized access points by monitoring network traffic. In particular, the gateway server detects the presence of the unauthorized access points by monitoring SNMP, MAC addresses, and 802.11 DS Layer signals and characteristics of network traffic on both the protected and unprotected sides of the gateway server.

In one exemplary implementation, visitors to a corporation may be allowed to access the Internet at a low data rate by entering their e-mail address. Employees from other offices may be required to enter a username and password to access the Internet and resources permitted by their home office server. Employees working with highly sensitive data may be subject to a very high level of security available from the gateway server that utilizes certificates, smart cards and/or secure token technologies.

In one embodiment, before the user makes a request to access the protected network, a role is previously defined in the gateway server for the user. A role also can be assigned based on the attributes of a user as provided by the external authentication server.

In one embodiment, a role definer in the gateway server defines roles and assigns them to users. The role definer can specify network resources and degree of access to the protected network, including connection bandwidth limits. The role definer can also specify a tunneling protocol (e.g. IPSec or PPTP) associated with a role. Thus, for example, once a role is assigned to the user, the user's bandwidth capacity is limited according to the assigned role. Access privileges can be differentiated for authorized users based on roles, instead of the commonly used "all or nothing" access. A particular role can be defined with different privileges in multiple resource locations. For example, an "engineer" role can be defined with full access to engineering department servers, but limited access to finance department servers.

Once the user is authenticated and assigned a role, an access controller in the gateway server provides access to the protected network based on the assigned role. A role includes one or more policies specifying the scope of performances permitted for the user. For example, in one embodiment, policies can include action, service, connection direction (e.g., to or from protected network, or both), and destination (e.g., resources in the protected network). The access controller evaluates each of the policies in the role to determine whether the services requested by the user should be allowed. If elements in a policy match the user's requests, then the requested actions are performed. If a match is not found even after checking all the policies, then "inherited" roles can be checked for the user.

For example, every employee can share the role of staff. The staff role can have a set of default policies, or privileges granted to everyone in the organization. A change to the inherited role need not be repeated in the other specific roles, since these changes will apply to all roles that inherit the change. If no match is found even with the default policies, the user is disallowed from performing the requested services.

In one embodiment, one or more additional gateway servers are interposed between the wireless network and the protected network to provide a fail-over configuration. If a first gateway server (also referred to as the primary server) fails, another gateway server (also referred to as the back-up server) receives the access request in the place of the first gateway server. In one implementation, there are more than one additional (or back-up) gateway servers. In this configuration, all set up information, additions and changes to the primary server are automatically propagated across and shared in real time with the back-up servers. The primary and the back-up gateway servers are connected via a fail-over interface. While the primary server is actively managing the user and the wireless network, the back-up servers remain idle. Concurrently, the back-up servers monitor a "heartbeat signal" of the primary server. If the back-up servers do not detect a certain number of heartbeats from the primary server in a specified amount of time, a fail-over occurs and one of the back-up servers takes over the role of the primary server and receives the requests from the user, without requiring new set-up and configuration.

In another embodiment, multiple gateway servers are interposed between different wireless networks and protected networks. These gateway servers replicate the configuration information of a single gateway server initially in communication with the mobile device. Such replication among the multiple gateway servers can be useful in administering a large-scale wireless network in that configuration changes are propagated from the single gateway server.

In some implementations, multiple gateway servers can be interposed between the protected network and unprotected wireless local area networks to create a "mesh network" architecture of gateway servers. The mesh network architecture can facilitate the seamless roaming of a mobile device from one gateway server to another gateway server, the fail-proof configuration, and the replication of configuration information for the gateway servers connected to form the mesh network. This mesh network of gateway servers acts as one managed system that controls access to the resources in the protected network via any of the various types of unprotected networks that could be in communication with the gateway servers. The unprotected networks can each be any of a radio-frequency based local are network, a cellular-based data network, or any type of a wired network. Any number of gateway servers can be supported by such a mesh network, depending upon implementation.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 4 is a user interface display in an embodiment for a system implementing the method of FIG. 2.

FIG. 6 is a user interface display in an embodiment for a system implementing role inheritance.

DETAILED DESCRIPTION OF THE PREFERRED EMBODIMENTS

Figure 1A:
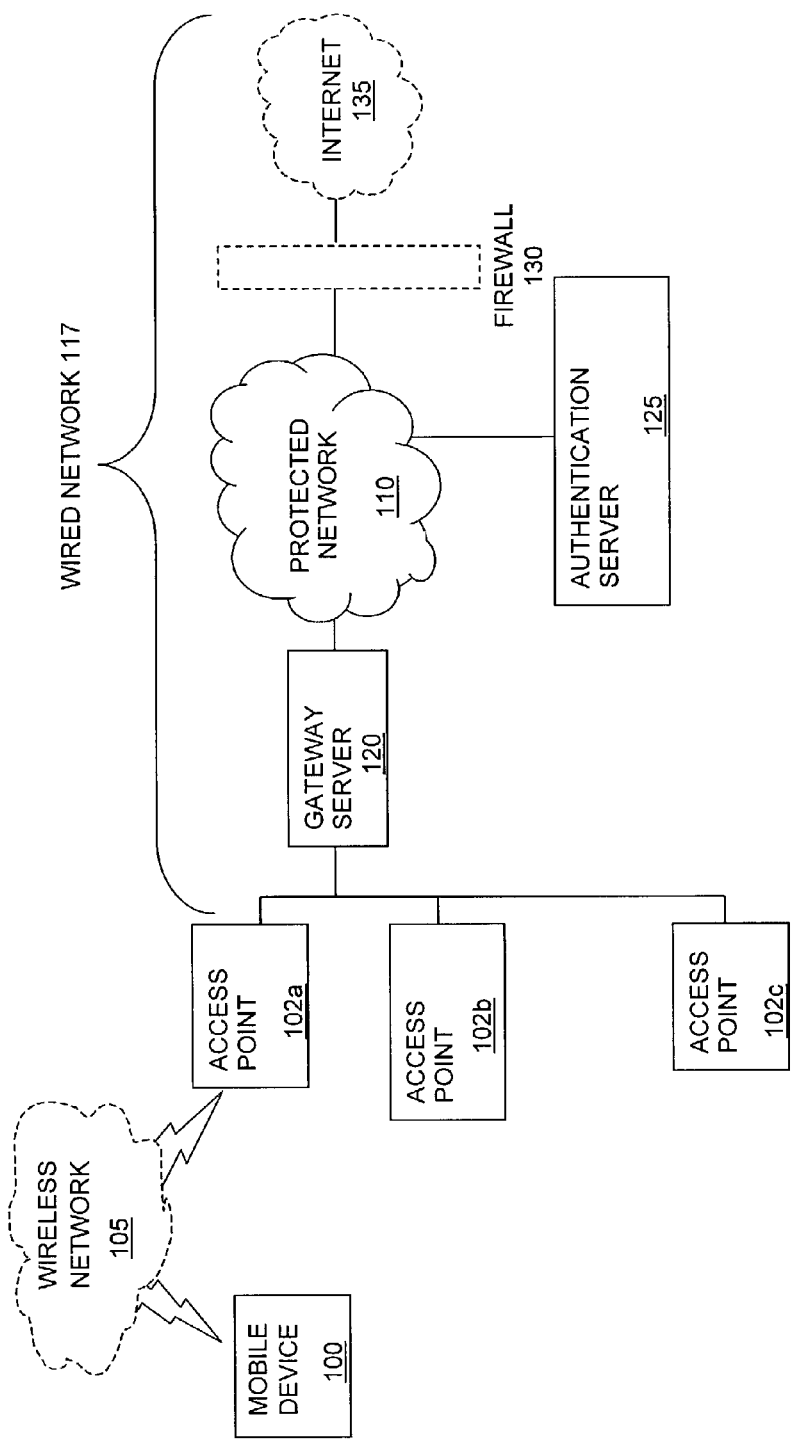
FIG. 1A is a block diagram depicting an embodiment of a gateway server managing a connection between a mobile device and a protected network.

Referring to FIG. 1A, in one embodiment, a user of a mobile device 100 communicates with an access point 102a via a wireless local are network 105 to access a protected network 110. The access point 102a is connected to a wired network 117, which includes a gateway server 120, the protected network 110, an authentication server 125, and a firewall 130 which is a gateway to the Internet 135. The mobile device 100 can be any sort of device that has wireless communication capability, including but not limited to hand-held, small, and large computers, personal digital assistants, peripherals, appliances, machines, telephones, toys, games, and so on. In one implementation, the mobile device 100 enters the coverage area of the access point 102a that communicates between the wireless network 105 and the wired network 117, and upon entry, the mobile device discovers and identifies the wireless network 105. The user of the mobile device 100 seeks to access the protected network 110 via the wireless network 105.

The wireless network 105 can be implemented with a wireless networking protocol, such as IEEE 802.11 (e.g., 802.11a, 802.11b, 802.11g), Bluetooth, ETSE HIPERLAN/2, and 802.1x, or other protocol. In some implementations, the wireless network 105 can support a wide variety of wireless networks, including cellular networks. In typical implementations, the wireless network 105 is radio frequency (RF) based network, operating on 2.4 GHz or 5.1 GHz. In another implementations, a private wireless network can be supported within privately-owned spectrum. It should be understood that the network 105 can be or can include or support any present or future wired or wireless networking protocol. The protected network 110 can be a wired network that typically includes an Ethernet network, and may include a DSL, T1, or T3 connection to yet another network, such as, for example, the Internet, or a WAN. The protected network 110 can be or can include or support any present or later-developed network, including without limitation, another wireless network.

For example, in an embodiment implemented in an enterprise setting, the mobile device 100 is typically a laptop computer or a hand-held device such as a personal digital assistant. The protected network 110 is typically a corporate or local intranet, which may or may not in turn access the Internet 135 through routers, gateways, firewalls 130, and so on. The access point 102a thus provides wireless access to the corporate intranet 110 (and possibly the Internet 135) via the wireless network 105. As another example (not shown), in a home, the mobile device 100 may be one of various electronic devices, computers, and appliances that include wireless networking hardware, and the protected network provides a connection (e.g. via DSL or cable modem) from the home to an Internet service provider's network, which in turn connects to the Internet.

Each of the access points 102a, 102b, and 102c (collectively 102) may be a relatively simple communication device that relays communications between the mobile device 100 and the wired network 117. The access points 102 are typically located in the same subnet as each other. In a TCP/IP network, such as used in the Internet, subnets are segments of the network that are typically connected by routers, where the routers forward packets from one subnet to another based on a packet's destination. For example, the gateway server 120 might be located in a subnet made up of 255 or fewer network nodes, called a class C subnet, that each typically share a common portion of their IP address, for example, 201.100.1.X, where X represents the portion of the address that will be different for each node in the subnet.

The access point 102a can be simple or complex in design and functionality. There can be multiple access points, 102a, 102b, and 102c connected to the same subnet and there can be other access points connected to other subnets. The various access points can use the same or different protocols, to communicate with a gateway server 120. The gateway server 120 provides sophisticated control functionality, yet the access points 102 are gateway server, router, and network agnostic. The access points 102 can be more complex and include gateway, router, or other more sophisticated processing functionality, or some combinations, although this functionality typically is not required.

For example, in one embodiment, the access point 102a is an off-the-shelf external PC-compatible access point. Such an access point typically has a data transfer rate of 11 Mbps in full duplex, thus 5.5 Mbps in either direction. The access point typically uses the Ethernet protocol but, since the gateway server 120 is access point agnostic, any type of present or future data link protocol supported by any manufacturer of the access point and the wireless devices can be used. The access point 102a can also include WEP data encryption for enhanced security. Examples of access points include, but are not limited to, the AXIS 9010 Bluetooth Access Point offered by AXIS COMMUNICATIONS of Lund, Sweden, Cisco Aironet 340 and 350 series from Cisco Systems, Inc. of San Jose, Calif., 3 CRW series from 3Com Corp. of Santa Clara, Calif., the AP-2001 Bluetooth Access Point offered by ANYCOM, INC. of Irvine, Calif., D-Link Air Series from D-Link Systems, Inc. of Irvine, Calif., and the Harmony 802.11 Series from Proxim Inc. of Sunnyvale of Calif.

In one embodiment, the gateway server 120 provides sophisticated functionality while keeping the level of sophistication required of the access points 102 to a minimum. An exemplary gateway server is the WG-1000 Wireless Gateway from Bluesocket, Inc. of Burlington, Mass. A gateway server 120 can also be implemented as, or as part of, any other suitable network device with software to implement the functions described herein. The gateway server 120 can be implemented as a server-class computer, such a PC having a CPU board containing at least one processor operating at a speed greater than 866 MHz. In one embodiment, the processors are selected from the Pentium or Celeron family of processors manufactured by Intel Corporation of Santa Clara, Calif. In another embodiment processors are selected from the "680x0" and POWER PC family of processors manufactured by Motorola Corporation of Schaumburg, Ill., the Alpha line of processors manufactured by Compaq Corporation of Houston, Tex., the CRUSOE line of processors manufactured by Transmeta Corporation of Santa Clara, Calif., and the ATHLON line of processors manufactured by Advanced Micro Devices, Inc., of Sunnyvale, Calif. The server computer also includes a main memory unit for storing programs and/or data. The memory capacity is 256 MBs or greater, and may include random access memory (RAM), read only memory (ROM), and FLASH memory.

The gateway server 120 typically also includes one or more storage devices, such as hard disk drive and a floppy disk drive. Other additional peripheral devices also can be included in a gateway server including output devices (e.g., printer or plotter) and/or optical disk drives for receiving, reading, and/or writing digital data on a CD-ROM and/or DVD. The controlling software program(s) and all of the data utilized by the program(s) are typically stored on one or more of the gateway server 120 storage mediums such as the hard disk drive, or the other additional peripheral devices, such as a CD-ROM.

The gateway server 120 can include a server-class operating system, such as Linux, available, for example, from Red Hat, Inc. of Durham, N.C., and Windows NT, available from Microsoft Corporation of Redmond, Wash. The gateway server can include a web server, for example an Apache web server, which sends out web pages in response to HTTP requests from remote browsers/users. An Apache server is an open-source HTTP server available from the Apache Software Foundation.

The gateway server 120 can also include IPSec or PPTP functionality according to the standards. Various software implementations of IPSec are available, including, for example, from Trilogy of Austin, Tex., Windows XP Pro IPSec Client, Windows 2000 IPSec Client, Safenet IPSec Client for Windows NT, Safenet IPSec Client for Windows 2000, SSH Sentinal IPSec Client for Windows NT or Windows 2000 from Microsoft Corp. of Redmond, Wash. Examples of software implementations of PPTP include, but are not limited to, the Windows 2000/XP/NT Client by Microsoft Corp. of Redmond, Wash. IPSec acts at the network layer, protecting and authenticating packets between participating devices, such as the access points 102 and the gateway server 120. One or more network interface cards (NICs) provide a physical connection to a wired or wireless network. The implementation of the NICs depends on the type of network 117, thus the gateway server 120 can utilize NIC from any vendor. If, for example, the wired network 117 is an Ethernet network, then the NICs provide an Ethernet interface. Examples of commercially available NICs are, but not limited to, EtherLink III Parallel Tasking Ethernet Adapters by 3Com of Santa Clara, Calif., Series A340, A350, and TrueMobile Series by Cisco Systems, Inc. of San Jose, Calif., D-Link Air Series by D-Link Systems, Inc. of Irvine, Calif., Quartet Server NICs by Adaptec of Milpitas, Calif., and the Intel Pro 100 and 1000 Series from Intel Corp. of Santa Clara, Calif., among many others.

The gateway server 120 is connected to at least two networks, i.e., the network to which the access points 102 are connected and the protected network 117, and the gateway server 120 forwards packets from one network to the other to reach their destination. The routing of packets is preferably performed by software running on the processor, in cooperation with the NICs and other hardware. Routing software is commercially available, for example, as part of the Linux operating system, and in various Windows server software programs.

An authentication server 125 is in communication with the gateway server 120. The gateway server 120 can use the authentication server 125 to authenticate the mobile device 100. The authentication server 125, which preferably is a RADIUS server, an LDAP server, or an NTLM server, can be administered by the same entity as the gateway server or can be a third-party authentication server, e.g., a server maintained by an authentication service provider and accessed, for example, over the Internet. The authentication server 125 is preferably implemented with software running on one or more server-class computers. The authentication server 125 can also be implemented as a special-purpose hardware device. Examples of RADIUS authentication servers are Funk Steel Belted RADIUS from Funk Software Inc. of Cambridge, Mass., and the Microsoft Radius server from Microsoft Corp. of Redmond, Wash. Examples of LDAP authentication servers are Open LDAP and Microsoft Active Directory from Microsoft Corp. of Redmond, Wash.

Figure 1B:
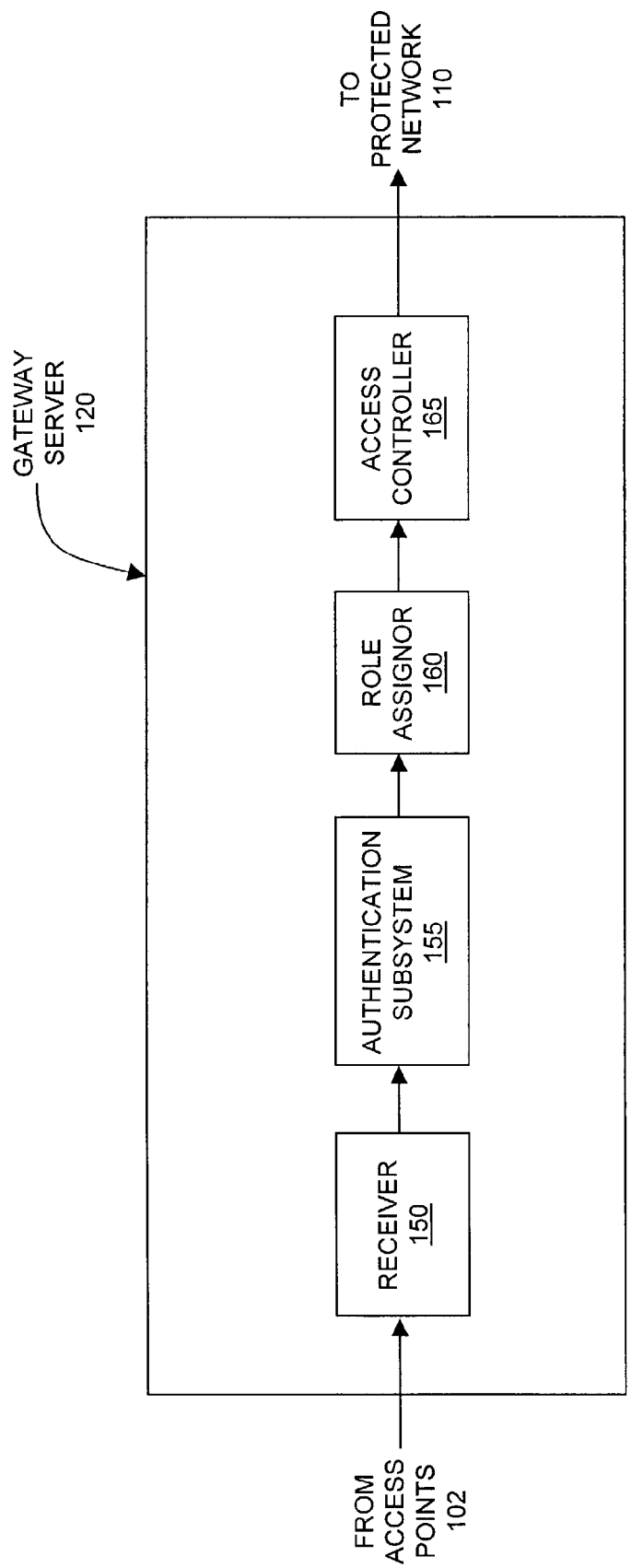
FIG. 1B is a block diagram depicting an embodiment of the gateway server as shown in FIG. 1A.

Referring to FIG. 1B, one embodiment of the gateway server 120 includes a receiver 150, an authentication subsystem 155, a role assignor 160, and an access controller 165. The receiver 150 receives a user's request to access the protected network 110. The authentication subsystem 155 authenticates the user and the user's mobile device 100 using the external authentication server 125. The role assignor 160 assigns a role to the authenticate user. The access controller 165 provides access to the protected network 110 based on the user's assigned role.

Figure 2:
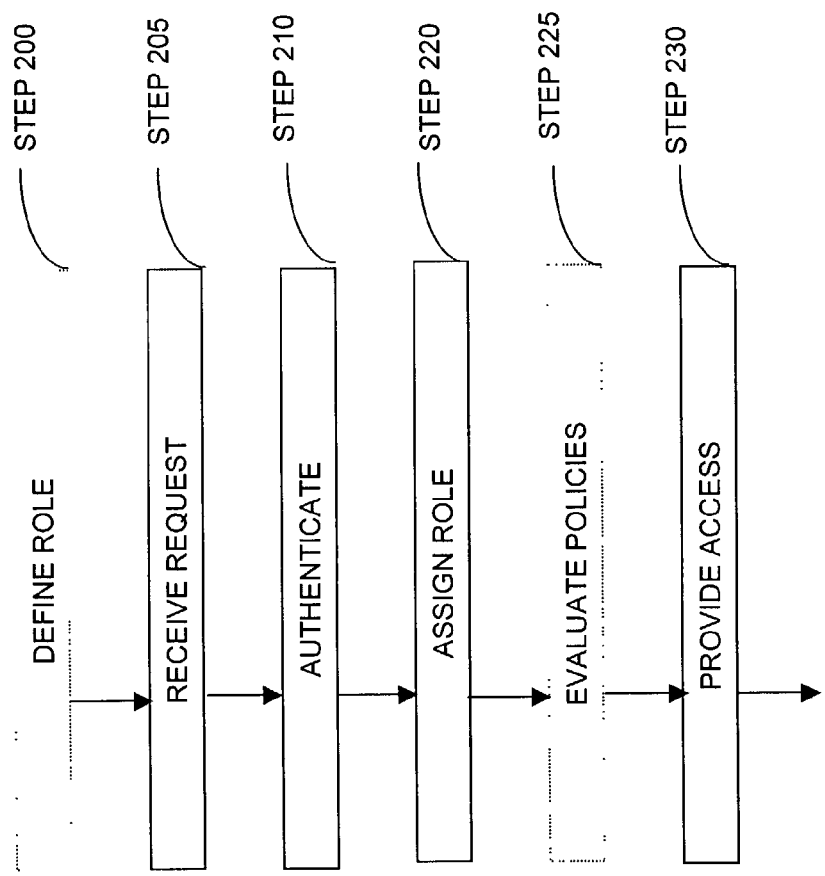
FIG. 2 is a flowchart depicting an embodiment of a method for managing a connection between a mobile device and a protected network.

Referring now to FIG. 2 (also FIGS. 1A and 1B for reference), in one embodiment, a user of a mobile device 100 makes a request to access the protected network 110 (STEP 205). This request comes from a mobile device 100 operated by the user. The request is communicated from the mobile device 100 to one of the access points 102, and relayed by the access point 102a, 102b, or 102c to the receiver 150 of the gateway server 120.

The user might make a request, for example, to access the protected network 110 to utilize the applications and retrieve information from the protected network 110. The user also may desire access to the protected network 110 to receive and transmit data across the wireless network 105 and the wired network 117 to another network. The request can include an identifier and authentication information, such as a user name and password. For a request to access highly sensitive network resource in the protected network 110, the gateway server 120 can require more than the user's name and password, such as one or more of a digital certificate and security codes. As another example, the request can be a web page request, only accessing the Internet and not the protected network 110. In this instance, the user's request may be made as just a request according to a particular protocol such as the hypertext transfer protocol (HTTP). Minimal information can be required for such a request, such as a user's e-mail address.

In one embodiment, as the gateway server 120 detects the presence of a new user, the gateway server 120 presents the mobile device with an authentication web page to make a request, which permits the user of the mobile device 100 to enter a name and password. The user is authenticated by the gateway server 120 based on the authentication information provided by the user. The request is transmitted through the wireless network 105 and forwarded to the access point 102a.

The mobile device 100 enters the communication range of the access point 102a associated with the wireless network 105 as the mobile device 100 physically moves from the access point 102b to the second access point 102a. The signal strength from the second access point 102a becomes stronger than the signal strength from the first access point 102b with respect to the mobile device 100. Subsequently, the mobile device 100 switches its communication from the first access point 102b to the second access point 102a based on the signal strength. Alternatively, regardless of the distance of the communication range or the signal strength, the access point 102a may be selected because it is the only access point available among the access points 102 and/or because it is a preferred access point (e.g., for load balancing purposes).

For example, the gateway server 120 may detect a triggering event that initiates a transfer of the mobile device 100 from one access point 102b to another access point 102a. One triggering event can occur as the mobile device 100 moves away from the communication range of the access point 102b. The gateway server 120 detects poor or declining quality of the connection (e.g., radio link) between the mobile device 100 and the access point 102b. A weakening reception of the wireless signal from the mobile device 100 can be indicated by increased packet loss to the mobile device 100 and/or by an indication of weakening reception, such as RSSI (Received Signal Strength Indication). A triggering event can also be indicated by congestion or a load balancing need of the access points 102 and the gateway server 120. For example, if the access point 102b becomes congested with mobile devices in comparison with the access point 102a, the gateway server 120 may decide to move the mobile device 100 to a less congested access point. A triggering event may also occur to fulfill a pre-defined service level for the user of the mobile device 100. Because the access point 102a is not congested, the access point 102a can ensure the user with a pre-defined service level. See, for example, U.S. patent application Ser. No. 10/055,028, filed Jan. 23, 2002, entitled METHODS AND SYSTEMS FOR ENABLING SEAMLESS ROAMING OF MOBILE DEVICES AMONG WIRELESS NETWORKS and U.S. patent application Ser. No. 10/032,199, filed Dec. 21, 2001, entitled METHODS AND SYSTEMS FOR CLOCK SYNCHRONIZATION ACROSS WIRELESS NETWORKS, which claims priority to U.S. Provisional Application Ser. No. 60/257,544, filed Dec. 26, 2000, the disclosures of which are incorporated herein by reference in their entirety.

Although not shown in this example, there is at least one gateway server 120 associated with each wired network subnet that connects the access points 102 and the gateway server 120. The gateway server 120 can monitor communications in the subnet (e.g., TCP communications) and respond to the request from the mobile device 100 communicating via one of the access points 102. It should be understood that the gateway server 120 can be connected to more than one subnet, particularly if the gateway server functionality is incorporated into a router or other device that typically is connected to more than one subnet.

The gateway server 120 authenticates the mobile device 100 utilizing its authentication subsystem 155, which may include authenticating the device or the user or owner of the device using an authentication server 125 (STEP 210). The authentication server 125 determines the access privileges assigned to users and allows access to the protected network 110 based on the access privileges. The authentication server 125 typically has information about authorized users or devices, and determines whether the mobile device 100 is authorized as well as the nature and extent of authorized access defined by, for example, a role (access privilege classification) and domain (area relevant to the user). For example, a student who takes history classes at a university may be assigned the "role" of a student member of the history department "domain," and the student's mobile device 100 allowed to access the history department network only to the extent permitted to students. Thus the mobile device 100 can be authorized to initiate a session with the protected network 110 via the wireless network 105 based on the access privilege information provided by the authentication server 125.

In one particular implementation, an authentication server 125 is already used for central authentication in the protected network 110. In such a case, the user can use the same identification and authentication information as if the user were accessing the wired network 110 of the organization. As discussed above, the central authentication server can be any sort of server, including a RADIUS server, an LDAP server, or an NTLM server. Because this configuration uses only one database for all forms of authentication, including, for example, dial-up access and sever log-in, as well as wireless access, large networks with many users can be managed more easily.

In another embodiment, the user is authenticated initially with an authentication database maintained by the gateway server 120 and then re-authenticated with the central authentication server 125. In yet another embodiment, the gateway server 120 uses only its own internal authentication database, rather than the central authentication server 125 to authenticate the user of the mobile device 100. The internal authentication database can be used when the external authentication server 125 is not available. The internal authentication database can also be used to provide authentication without delay, waiting for a response from the external authentication server 125. The gateway server 120 maintains authorized users' user names and passwords provided, for example, using an authentication web page in its internal authentication database. When a user is authenticated via the external authentication server 125, the gateway server 120 retains the authorized user's name and password, as well as the assigned role, and stores the information in the internal authentication database in a hashed form. When a user makes a request to log in, the gateway server 120 can perform a look-up in its internal database to see if the user's name and password are stored internally. If the requested user's name and password match the stored information in the internal database, then the gateway server returns the user's assigned role and grants access to the protected network 110 based thereon.

In one embodiment, authentication (STEP 210) is accomplished by interaction with an authentication web page maintained by, for example, the authentication server 125. The local gateway server 120 redirects all requests from the mobile device 100 made with a particular protocol (e.g., HTTP) to the authentication web page. The mobile device 100 (or the user of the mobile device 100) then supplies identifier and authentication information to the authentication web page. Identifier information can include one or a combination of a username, e-mail address, or other unique name associated with the user of the mobile device 100, the mobile device 100, an object such as a smart card, and so on. Authentication information can include one or a combination of personal identification number (PIN), password, encryption key, biometric information, digital certification, and digital code, as well as other information that is associated with at least one of the user of the mobile device 100, the mobile device 100, a smart card, and so on.

The identity and authentication information required from the user can vary based on the status of the user. For example, visitors to the organization may be allowed to access only the Internet at a low data rate by merely entering their e-mail address. Employees from branch offices may be required to enter their LAN and/or WAN username and password to access the Internet and resources permitted by their home office server. Employees working with highly sensitive data may be subject to the highest level of security available from the gateway server 120 requiring such items as digital certificates, smart cards, and secure token technologies.

Referring again to FIG. 2 (and still to FIGS. 1A and 1B), in one embodiment, the gateway server 120 responds to the request by assigning a role to the user (STEP 220) through its role assignor 160. A role sets a boundary for access privileges, such as particular network resources, bandwidth capacity, and security protocol, to which a group of users is restricted. The network resource privileges for a role are configured under one or more policies including Action, Service, Direction (network traffic from the protected side), and Destination (resources in the protected side). These are described further below. The role can designate that members of a role cannot use more than a stated maximum bandwidth set forth by the role. The role can also designate a security protocol for its members. For example, the gateway server 120 includes PPTP and IPSec.

The IPSec protocol is particularly useful for users communicating sensitive data to and from the protected network 110. IPSec is commonly used to describe a combination of two protocols: IPSec and IKE (Internet Key Exchange). IKE is a protocol that enables an encrypted connection to be negotiated between two end points. IPSec data exchange is based on symmetric keys; IKE uses asymmetric keys (e.g., keys from a public key infrastructure) to initiate an IPSec link. Any device on a network can be an endpoint of an IPSec link, and some access points may have this functionality. Even though IPSec is a standard, it can be implemented with different features and options that may be vendor dependent. IPSec does not require specific algorithms to be used for authentication, encryption, or compression, any algorithm(s) can be used within the parameters of the protocol. Examples of commonly supported algorithms are DES (Data Encryption Standard), 3DES (Triple DES), AES (Advanced Encryption Standard), and ECC (Elliptical Curve Cryptography). By placing the IPSec endpoint functionality in the gateway server 120 and not the access points 102, the version of IPSec supported by a given access point becomes irrelevant. Further, if the gateway server 120 provides IPSec functionality, the access point can remain simple and inexpensive.

As the mobile device 100 enters the communication range of the access points 102, one of the access points 102 can receive a signal from the mobile device 100 based on the criteria previously discussed. In one embodiment, the gateway server 120 can transparently authenticate the user without requiring any information from or interactions with the user. This transparent authentication allows the mobile device to roam seamlessly in a wireless network without having to submit authentication information when it changes to a subnet handled by a new gateway server. The mobile device 100 can move from one access point in one subnet to another access point in a different subnet without having to log out of its current session with the first subnet and obtain a new network address to connect to the new subnet.

In one embodiment, the gateway server 120 retains its connection information (also referred to as the context information) with a user of the mobile device 100 belonging to a role, a group of users performing similar duties in an enterprise. For example, even after the mobile device 100 moves outside the service area of the gateway server 120 and loses its connection with the gateway serer 120, if the mobile device 100 returns to the service area of the gateway server 120 afterward, the mobile device 100 can access the protected network 110 without re-registration or re-authentication based on the connection information for the mobile device 100 retained and reused by the gateway server 120. The gateway server 120 sets access privileges for a role of users of the wireless network 105, so that the gateway server 120 can determine the access-privileges associated with the role to which a user belongs, in addition to the user and/or device identifier information. The device identifier is a unique identifier, such as a Media Access Control (MAC) address, IP address, or other address or identifier.

The authentication server 125 identifies users belonging to a role in an enterprise, such as a student in a university. The gateway server 120 obtains access privilege information based on at least one of the device identifier, user identifier, the role membership information, and context information. Examples of context information are a network address of the mobile device 100 used for a previous session and pointer information to the user's role. The gateway server 120 saves the context information associated with a previous session between the mobile device 100 and the resource in the protected network 110 and reuses the information for the current session between the mobile device 100 and the resource without re-authentication. See, for example, U.S. patent application Ser. No. 09/911,092, filed Jul. 23, 2001, entitled METHOD AND SYSTEM FOR ENABLING SEAMLESS ROAMING IN A WIRELESS NETWORK, which claims priority to U.S. Provisional Application Ser. No. 60/220,385, filed Jul. 24, 2000 and U.S. patent application Ser. No. 10/035,569, filed Oct. 22, 2001, entitled METHOD AND SYSTEM FOR ENABLING CENTRALIZED CONTROL OF WIRELESS LOCAL AREA NETWORKS, which claims priority to U.S. Provisional Application Ser. No. 60/241,975, filed Oct. 23, 2000; the disclosures of which are incorporated herein by reference in their entirety.

Furthermore, in one embodiment, the gateway server 120 enables a mobile device to roam from a first wireless network associated with a first gateway server to a second wireless network associated with a second gateway server. In some instances, the first wireless network and second wireless networks use different communication technologies (e.g., a cellular network or a GGSN 2.5/3G network, and an 802.11b network). As the mobile device 100 enters the subnet of the second gateway server, the second gateway server receives a request for the first gateway server by the mobile device 100. The second gateway server recognizes that the request is for a known server, and as a result, the second gateway server responds to the request on behalf of the first gateway server and informs the mobile device that it is replacing the first gateway server in serving the mobile device 100. Based on the authentication and identification information of the mobile device 100 and a user of the mobile device 100, the second gateway server can identify the home gateway server of the mobile device and notify the home gateway server that the mobile device is currently communicating with the second gateway server. A tunnel may be established between the home gateway server and the second gateway server in order to forward data for the mobile device 100 via the tunnel to the second gateway server. See, for example, U.S. patent application Ser. No. 10/055,028, filed Jan. 23, 2002, entitled METHODS AND SYSTEMS FOR ENABLING SEAMLESS ROAMING OF MOBILE DEVICES AMONG WIRELESS NETWORKS, the disclosure of which is incorporated herein by reference in its entirety.

A detection feature of the gateway server 120 can detect the presence of unauthorized or "rogue" access points, for example, access points installed without the knowledge or approval of network managers of an enterprise. The gateway server 120 can monitor traffic on the network looking for MAC (Media Access Control) addresses associated with known access point vendors. The gateway server 120 can also detect the presence of unauthorized access points by monitoring SNMP and 802.11 DS Layer signals, and characteristics of network traffic on both the wired and wireless sides.

As discussed above, in one embodiment, the gateway server 120 authenticates the mobile device 100 using the authentication server 125. Initially, the local gateway server 120 redirects all HTTP requests from the mobile device 100 such that the web browser on mobile device 100 is presented with an authentication web page, which permits the user or the mobile device 100 to provide a user name and password. The central authentication server can be configured to permit the user to use the same identification and authentication information used to access other resources in the protected network 110. Once the user has been authenticated, the gateway server 120 returns the user to the web page originally requested.

In one implementation, to avoid capture of authentication information by rogue access points, the gateway server 120 can require all users to authenticate via a web browser page served from a secure web server that uses digital certificates. Using the Secure Sockets Layer (SSL) protocol, the browser recognizes that the server certificate is one of the reference certificates stored in the browser. Examples of web browsers include, but are not limited to, Microsoft Internet Explorer Browser and Netscape Browser.

In another embodiment, the gateway server 120 can passively monitor an authentication process between a mobile device and a server. If the server successfully authenticates the device, the gateway server assigns a role to the mobile device based on the authentication. A user authenticated in this manner does not need to authenticate separately to the gateway server, and in this way the gateway server operation is transparent to the user.

For example, in one embodiment, the gateway server 120 allows initial access by all mobile devices to a file server sufficient to allow authentication to that file server. If the authentication is successful, the mobile device 100 is assigned to a role designating privileges associated with users who can access that file server. In one implementation, if authentication with the file server is not successful, further access to that file server can be denied, for example after a certain number of attempts, or after a certain time period. In some embodiments, authentication information is extracted from the authentication protocol, for example a user name, or network address, network domain, or other identifier. The gateway server 120 specifies a role for the mobile device 100 based on this information if authentication with the server is successful.

This protocol is straightforwardly implemented in connection with the standard protocols currently in use for authentication. In one example, the gateway server 120 integrates with Microsoft NT and Windows 2000 environment by passively monitoring the communication between a mobile device and Windows servers. The user of the mobile device 100 authenticates only to Windows server, and the gateway server determines from the communication between mobile device and server whether the authentication was successful. For example, the gateway server can monitor the SMB and Kerberos protocol exchanges to verify that the user has successfully authenticated to specific servers. Based on the authentication results, a proper role is assigned.

Referring still to FIGS. 1A, 1B, and 2, before the user makes a request to access the protected network 110, the gateway server 120 can be used to define a role for different individual users or groups of authorized users for the protected network 110 based on the users' roles or status in the organization (shown as optional STEP 200). In one embodiment, the gateway server 120 uses a web-browser interface to define a role and set up parameters for the role. A particular role can be configured with different privileges for resources. For example, an "engineering" role can be defined with full access in the engineering department servers, but limited access to the finance department servers. Additionally, a role can be defined with access to an IP address subnet or a router.

Figure 3:
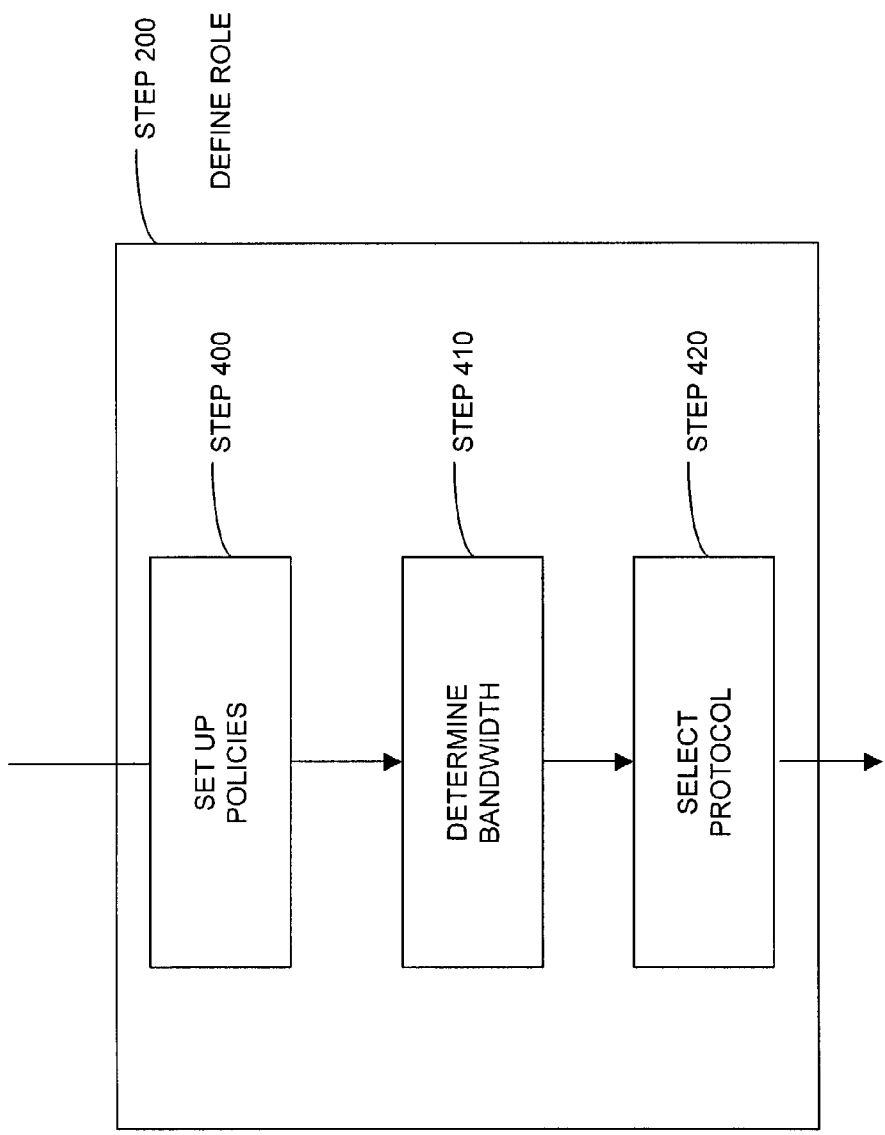
FIG. 3 is a flowchart depicting role definition in one embodiment of the method of FIG. 2.

Referring to FIG. 3, defining a role includes specifying one or more policies that set the boundaries for each action or service to be allowed for members (STEP 400). In one embodiment, each policy has four elements: 1) Action, 2) Service, 3) Direction, and 4) Destination. The Action indicates whether the service under the corresponding policy is allowed or denied. The gateway server 120 includes a set of network services that users can access, if permitted by the role which they are assigned. Examples of available Service options are: HTTPS (Hypertext Transfer Protocol over Secure Socket Layer, or HTTP over SSL), HTTP, DNS, POP-3, SMTP, Telnet, SSH, FTP, POP-2, and so on. Additional network services can be specified. The Service can specify protocols such as TCP, UDP, both TCP/UDP or a protocol other than TCP and/or UDP. The Direction defines the direction of a network connection initiation for which the service access is allowed or denied from the perspective of the gateway server 120. For example, the Direction can be set as Outgoing, Incoming, and Both Ways. Outgoing means the network connections can only be initiated from the wireless side to services or destinations in the protected side 110, and Incoming refers to connections initiated from the protected side. Both Ways refers to bi-directional initiation. The Destination lists correspond to a resource or group of resources in the protected network 110. The Destination can be a single device or location within a network, for example, such as a marketing server. The Destination can also be all devices and/or location reachable within a network address space, such as all servers in a department's subnet. Policies can be easily added, deleted, and amended, e.g., through the use of a drop-down list in the web-browser interface.

For example, FIG. 4 is a user interface display in an embodiment for a system defining a role called "Engineering" that blocks access to the finance department server but allows web and e-mail access to all other servers and resources in the protected network 110. Still referring to FIGS. 2–4, when creating this role, the total bandwidth allocated to all users with the same role can be predetermined (STEP 410). The security protocol is defined as PPTP rather than IPSec (STEP 420). An additional security protocol, such as subnet VPN, can be added to provide more security measures for users. Thus, the gateway server 120 can set up, enable, and delete parameters for PPTP, IPSec, and a subnet VPN. For the first policy, the "Engineering" role is denied access to the financial server in both directions. For the second policy, HTTP service is allowed in the both directions for all servers in the protected network 110. For the third policy, HTTPS service is allowed in both directions for all servers in the protected network 110. For the fourth policy, SMTP service is allowed in only the outgoing direction for all servers in the protected network 110. For the fifth policy, POP-3 service is allowed only in the outgoing direction for all servers in the protected network 110.

Referring again to FIG. 2 (and still to FIGS. 1A and 1B), the access controller 165 of the gateway server 120 provides differential levels of access to the user based on the policies set forth in the user's assigned role (STEP 230). Once a role is assigned to the user, each policy in the role is evaluated (STEP 225) before allowing requested service to the user. If the gateway server 120 does not specify any policy within the assigned role for the user, then the gateway server 120 denies access to all services and all destinations by default. The gateway server 120 evaluates each policy in the assigned role to determine whether the user's requested services should be performed (STEP 225).

Figure 5:
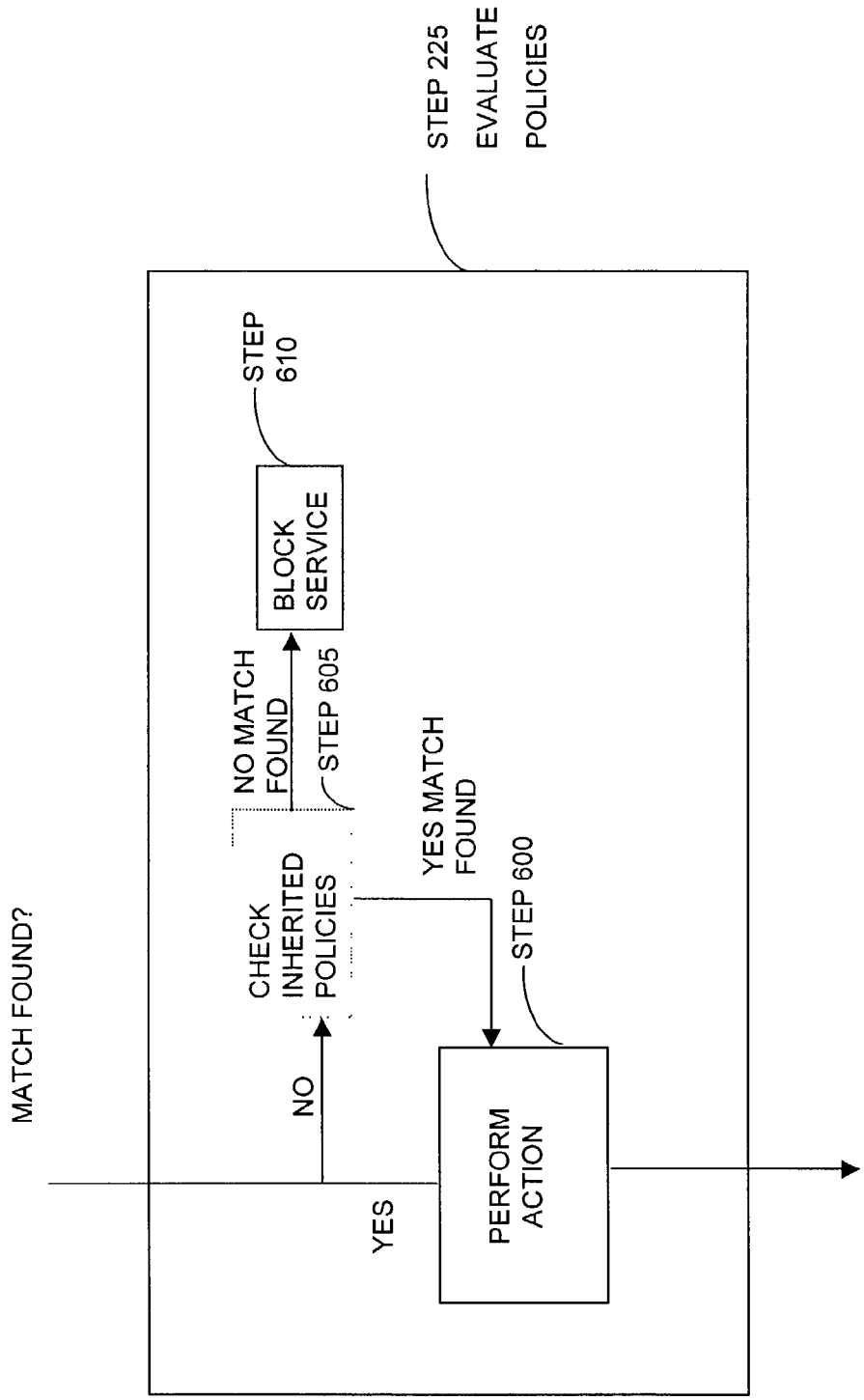
FIG. 5 is a flowchart depicting the details of evaluating policies in one embodiment of the method of FIG. 2.

Referring to FIGS. 4 and 5, the policies are evaluated in the order of top to bottom, although the order can be changed by the use of the web-browser interface. All of the elements in each policy must match the requested service in order for the gateway server 120 to allow the requested service (STEP 600). If any of the elements do not match the requested service, then the user is blocked from performing such a service (STEP 610).

Every member of an enterprise typically shares certain access privileges and these shared access privileges can be mapped according to the enterprise's structure by the gateway server 120 through a role inheritance feature. For example, all employees are likely to have access to some resources of the enterprise, but only members of the information technology group (IT) are likely to have access to others. Commonly held privileges, such as access to the cafeteria, can be defined as a base role. When defining a more responsible role, such as "member of IT," the base role can be specified as a default set of privileges that are available (e.g., inherited).

Referring to FIG. 5, if the assigned role has an inherited role, even if the elements in the policies do not match the requested service, the requested service is not blocked until the inherited role is checked. As discussed previously, every employee is a staff member to the corporation, and thus might share the role of staff. Commonly held access privileges or the status of authorized users, such as staff, can constitute an inherited role. Just like any other role, the inherited role has a set of default policies, or privileges granted to the users. A change in the inherited role does not need to be repeated in the other specific roles, since this change will also be inherited by all the roles. Thus, there is less chance of error when a change is made only to the inherited role rather than to all the roles that use the inherited role. For example, suppose the corporation has set up a Sales role and an Engineering role. The Sales role may only have FTP access to the Sales server and the Engineering role may only have FTP access to the Engineering server. However, all members of the corporation should be allowed to read or send e-mail and access the Web on any server as a staff of the corporation.

Referring to FIG. 6, in order to configure an authorization system that takes advantage of inheritance, the gateway server 120 first defines an inherited role (e.g., Staff role) that lists privileges granted to everyone in the organization. Thus, just like the role-defining step as described previously in FIG. 2 and FIG. 4, the same user interface display is used to configure the role of "Staff." As shown, the total bandwidth capacity allocated for all users within this role is set to 5 Mbits/second, the security protocol is set to PPTP, and the policies are defined so that all "Staff" members can read or send e-mail and surf the Web on any server. In the Engineering role web-interface of FIG. 4, the inherited role of Staff is inserted in the "Inherit from role" box, so that the gateway server 120 automatically evaluates the inherited role if the server 120 cannot find a match in the policies set forth for the specific assigned role. Thus, if a match is not found in the policies of the assigned role, then the policies in the inherited role are checked (as shown in phantom in STEP 605). If a match is found in the inherited policies, then matched performance is allowed for the user (STEP 600); otherwise, the requested service is blocked by the gateway server 120.

Figure 7:
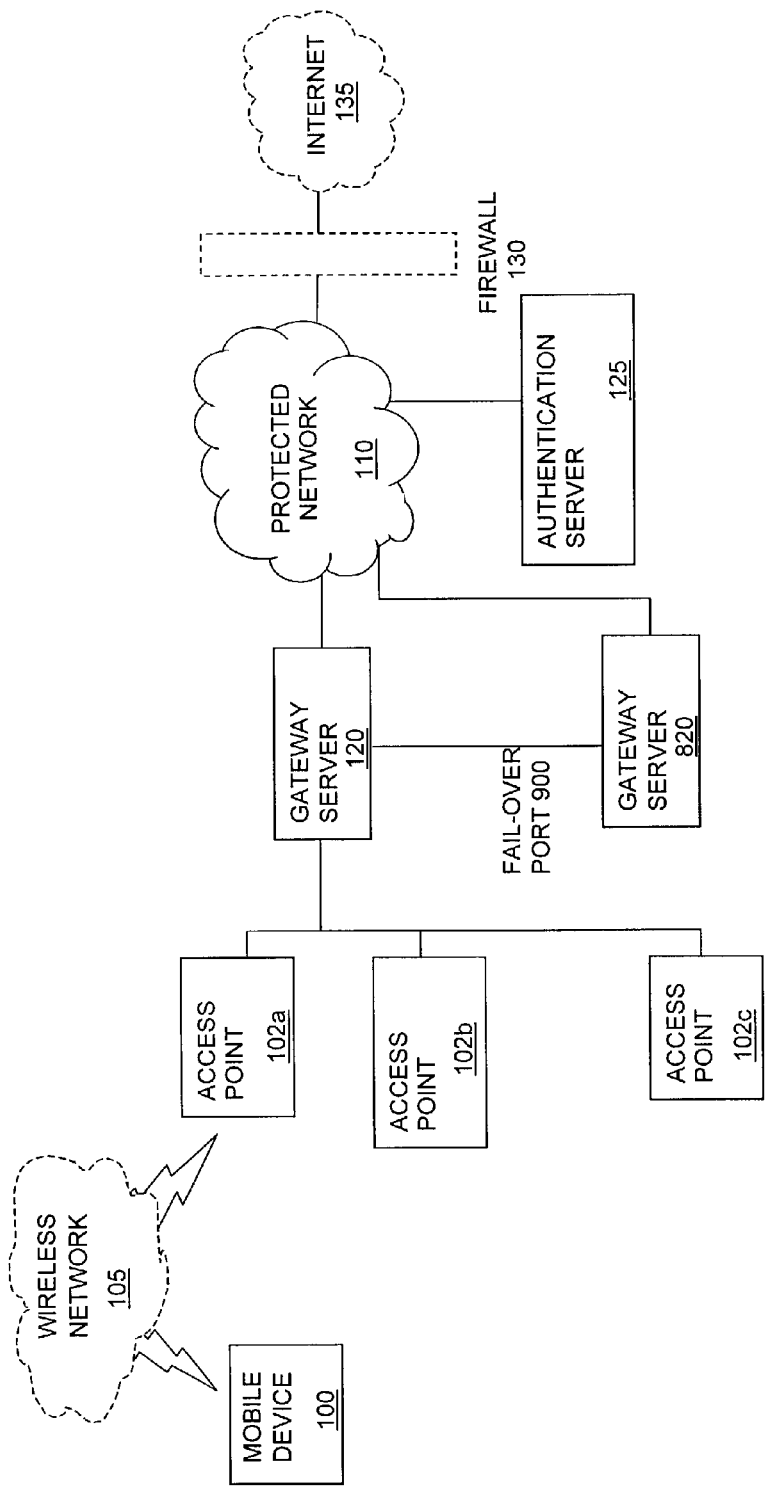
FIG. 7 is a block diagram depicting a fail-proof configuration as described in an embodiment of the invention.

Referring to FIG. 7, additional gateway servers can be configured to provide a fault-tolerant configuration. The gateway server 120 can be configured as a primary, on-line gateway server in an active state. The other gateway server 820 can be configured as a back-up, stand-by gateway server. In another embodiment, there is more than one back-up gateway server. The back-up gateway server 820 is configured so that all set-up information, additions, and changes to the primary server 120 are automatically propagated across and shared in real time with the back-up server 820 through a fail-over interface, e.g., an Ethernet adapter connecting the primary server 120 and the back-up server 820. The primary gateway server 120 alone manages the user and the wireless network while the back-up gateway server 820 remains in its stand-by mode. The back-up server 820, meanwhile, monitors a "heartbeat" signal, e.g., exchange of short messages in a time frame, of the primary gateway server 120 and accepts input from the primary gateway server 120. If the back-up server 820 does not detect a certain number of heartbeats in a specified amount of time, and realizes that the back-up server 820 is unable to communicate with the primary gateway server 120 via fail-over port 900, then a fail-over takes a place and one of the back-up server 820 takes over the primary server role without requiring new set-ups and configurations. If the primary gateway server 120 recovers, then the gateway server 120 becomes the back-up gateway server to the gateway server 820. Thus once again no manual intervention is necessary, and the same network availability is maintained through the back-up gateway server 820.

Figure 8:
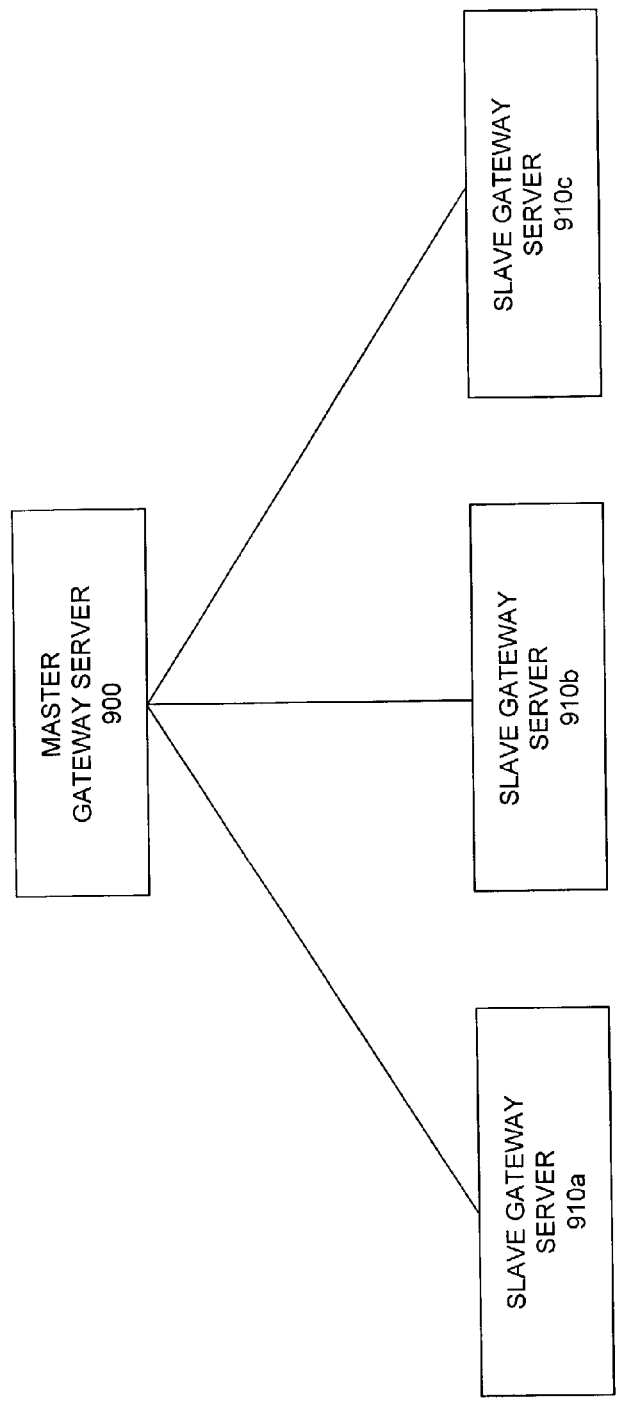
FIG. 8 is a block diagram depicting a multi-gateway server replication configuration.

Referring to FIG. 8, two or more gateway servers can be used in a large-scale wireless network in a multi-gateway server configuration. Replication of information among the multiple gateway servers can be useful in handling networks for a large organization. For example, it may be convenient to divide an enterprise's wireless local are network configuration by floors, subnets, buildings, and so on, by placing one gateway server per local wired subnet. In some embodiments, as discussed previously, a user can remain seamlessly connected to the protected network without having to authenticate because the gateway servers communicate with each other. Thus, once a mobile device and a user of the mobile device are authenticated by a gateway server, the mobile device can be supported by the remaining gateway servers and maintain its connection even if the mobile device moves outside the communication range of the initial gateway server.

In one embodiment, in a multiple gateway server configuration, one gateway server is designated as a Master gateway server 900 and all other gateway servers are designated as Slave gateway servers 910a–c (collectively 910). The configuration information in the Master gateway server 900, except for data interface, maintenance, and status functions, is shared in real time with the Slave gateway servers 910. Initial setup information and subsequent changes are propagated from the Master gateway server 900 to the Slave gateway servers 910. Thus, configuration changes are made on the Master gateway server 900. Referring to FIGS. 7 and 8, each of the primary gateway server 120 and the back-up gateway server 820 can provide configuration replication.

Figure 9:
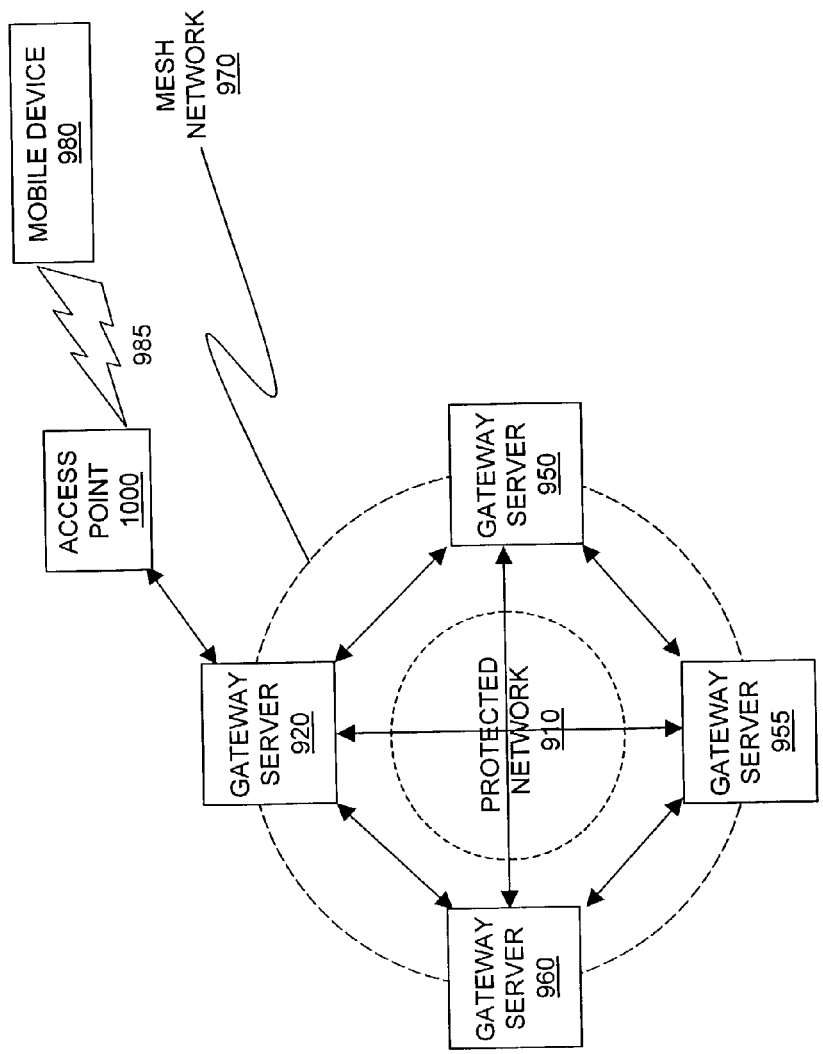
FIG. 9 is a block diagram depicting an embodiment of a mesh network infrastructure including multiple gateway servers.

Referring to FIG. 9, access to a protected network 910 can be controlled and facilitated by a mesh network of multiple gateway servers 920, 950, 955, 960. An exemplary embodiment of each gateway servers 920, 950, 955, 960 is described with reference to the gateway server 120 shown in FIGS. 1A and 1B. The multiple gateway servers support a mesh network 970 architecture that facilitates the seamless roaming of the mobile device 100, the redundant configuration (described with reference to FIG. 7) and the configuration replication (described with reference to FIG. 8). The mesh network 970 of gateway servers 920, 950, 955, 960 provides a single managed system where each of the gateway servers 920, 950, 955, 960 communicates with each other. In addition, the mesh network 970 of the gateway servers 920, 950, 955, 960 is interposed between the protected network 910 and a mobile device 980 (and a network 985) to act as a boundary or a wall that separates the protected network 910 from unauthorized mobile devices. The networks outside the mesh network 970 (e.g., network 985) can be different types of networks, including RF based networks, cellular networks, 802.11 networks, or any other wireless or wired present and future networking protocols. Although only four gateway servers are shown in this example, any number of gateway servers can be connected to the protected network 910 to form the mesh network 970 of gateway servers.

For example, each gateway server 920, 950, 955, 960 can act as a point of communication for a mobile device 980. Each gateway server 920, 950, 955, 960 can be designated as a primary gateway server or a back-up for another gateway server. In combination with high level of security and access management features supported by each of the gateway servers 920, 950, 955, 960 (discussed previously), each of the gateway servers 920, 950, 955, 960 can support any number of connections to the other gateway servers in the mesh network 970 to provide one or combination of the seamless mobility architecture, the fail-over redundant configuration and configuration replication.

In one embodiment, the gateway servers 920, 950, 955, 960, communicate to each other connection information about the mobile device 980. For example, one gateway server 920 can communicate connection information to another gateway server 950 and that gateway server 950 can subsequently relay the information to yet another gateway server 955 as the mobile device moves from one subnet to another. The gateway server 920 can also distribute (e.g., broadcast) the connection information to other gateway servers 950, 955, 960. In another embodiment, one gateway server 960 serves as a registry of connection information (also referred to as a home gateway server 960) for the mobile device 980 that is connected to one of the gateway servers 920, 950, 955, 960.

In some implementations, the seamless roaming architecture uses connections between each pair of gateway servers 920, 950, 955, and 960 in the mesh network 970 to synchronize client connection information between the gateway servers 920, 950, 955, 960 in the mesh network 970 as the mobile device 980 moves from the service area of one gateway server to another gateway server. In one exemplary embodiment, the mobile device enters the service area of the new gateway server 920 via the wireless local network 985 and the access point 1000. The authentication server (not shown in FIG. 9, but shown as the authentication server 125 in FIG. 1A) is configured to authenticate the mobile device based on the information collected from previous sessions between the mobile device 980 and different gateway servers in the mesh network 970. The mobile device 500 does not need to request a new network address to connect with the gateway server 920 nor re-register with the new gateway server 920, as long as the gateway server 920 has been connected to one or more of the remaining gateway servers 950, 955, 960 in the mesh network 970.

In one embodiment, the mobile device 980 moves from the coverage area of one of the gateway servers 950, 955, 960 associated with a wireless network to the gateway server 920 associated with another wireless network 985. The associated wireless network of the gateway servers 920, 950, 955, 960 can be any type of wireless or wired local area network, supporting any type of present and/or future networking protocols. The initial wireless network can the same type of network as the wireless network 985. The initial wireless network can also be substantially incompatible with the wireless network 985. In one embodiment, the mobile device 980 moves from the initial wireless network to the wireless network 985. The mobile device 980 sends data to the network address (e.g. MAC address) of the previous gateway server to forward these data to their destination. As discussed previously, the gateway servers 920, 950, 955, 960 are connected via the mesh network 970 to maintain synchronized client/mobile device information while the mobile device 980 roams across the gateway servers 920, 950, 955, 960. Accordingly, the gateway server 920 responds to the request of the mobile device 980 by providing its network address to the mobile device 980, after verifying with an authentication server that the mobile device 980 has already been authenticated via the home gateway server 960 or any of the gateway servers in the mesh network 970. The gateway server 920 can serve the mobile device 980 on behalf of the previous gateway servers 920, 950, 955, 960 by communicating with the home gateway server 960. Because the mobile device 980 uses the same network address and maintains its connection with the protected network 910 throughout roaming, the change of the gateway servers is transparent (seamless) to the mobile device 980. The gateway server 920 identifies the home gateway server 960 for the mobile device 980 and updates the location information of the mobile device 980 with the home gateway server 960.

In some implementations, the gateway servers 920, 950, 955, 960 in the mesh network 970 have established tunnels that route the requests of the mobile device 980 to the home gateway server 960. Thus the data addressed to the mobile device 980 are first forwarded to the home gateway server 960. The home gateway server 960 then forwards the data to the gateway server 920 via the tunnel, which in turn forwards the data to the mobile device 980 via the wireless local area network 985.

In one embodiment, the gateway servers 920, 950, 955, 960, are interconnected by a network connection that can be wireless or hard-wired. The interconnection between the gateway servers 920, 950, 955, 960 can serve to support configuration replication. With regard to content/configuration replication, one of the gateway servers 920, 950, 955, and 960 can be designated as a Master gateway server, and the others as Slave gateway servers as described above with reference to FIG. 8. Another set of interconnections between two or more of the gateway servers 920, 950, 955, 960 can serve as a fail-over port 900 to support the fail-over configuration, as described above with reference to FIG. 7. See, for example, U.S. patent application Ser. No. 10/055,028, filed Jan. 23, 2002, entitled METHODS AND SYSTEMS FOR ENABLING SEAMLESS ROAMING OF MOBILE DEVICES AMONG WIRELESS NETWORKS and U.S. patent application Ser. No. 09/911,092, filed Jul. 23, 2001, entitled METHOD AND SYSTEM FOR ENABLING SEAMLESS ROAMING IN A WIRELESS NETWORK, which claims priority to U.S. Provisional Application Ser. No. 60/220,385, filed Jul. 24, 2000, the disclosures of which are incorporated herein by reference in their entirety.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for managing access control and security with a gateway server interposed between a wireless local area network and a protected network, the method comprising the steps of:

(a) receiving, by a first gateway server from a user of a mobile device that is in communication with the gateway server via a wireless access point, an indication of a request to access another server on the protected network;

(b) passively monitoring, at the gateway server, an authentication process between the user and the another server in which the user makes a request to authenticate to the another server and the another server authenticates the user;

(c) assigning a role to the authenticated user based on the another server with which the user authenticated; and (d) providing access to the protected network based on the assigned role.

2. The method of claim 1 further comprising providing a second gateway server interposed between the wireless network and the protected network for a fail-over configuration, and wherein step (a) further comprises receiving the request by the second gateway server if the first gateway server fails.

3. The method of claim 1, wherein the request to access the protected network received in step (a) comprises an identifier and authentication information.

4. The method of claim 3, wherein the identifier comprises at least one of a username, an email address, and an unique name.

5. The method of claim 3, wherein the authentication information comprises at least one of a PIN, password, digital certificate, encryption key, and digital code.

6. The method of claim 1, wherein the request to access the protected network received in step (a) comprises a request to access network resources.

7. The method of claim 6, wherein the authenticating step (b) comprises authenticating a previously authenticated user without requiring communication of authentication information.

8. The method of claim 1, wherein the external authentication server comprises a RADIUS server.

9. The method of claim 1, wherein the external authentication server comprises a LDAP server.

10. The method of claim 1, wherein the external authentication server comprises a NTLM server.

11. The method of claim 10, wherein the use of the external authentication server is transparent to the user.

12. The method of claim 11, wherein the server is a Windows 2000 or NT server.

13. The method of claim 1, wherein the authenticating step (b) is performed substantially according to one of the Point-to-Point Tunneling Protocol (PPTP) or the IPSec protocol.

14. The method of claim 1 further comprising, prior to step (a), the step of defining the role for the user.

15. The method of claim 14, wherein the step of defining a role further comprises:
   (i) specifying network resources available;
   (ii) specifying a degree of access to the protected network; and
   (iii) specifying an available connection bandwidth.

16. The method of claim 15, wherein the defining step further comprises: (iv) specifying a tunneling protocol.

17. The method of claim 15, wherein the defining step further comprises: (v) specifying an inherited role.

18. The method of claim 1 further comprising replicating a plurality of second gateway servers interposed between the wireless network and the protected network from the first gateway server.

19. The method of claim 1 further comprising protecting from illicit monitoring using a secure web browser page.

20. The method of clam 1 further comprising detecting unauthorized access points by monitoring network traffic.

21. The method of claim 1 wherein the assigned role comprises one or more policies.

22. The method of claim 21 wherein the policies describe one or more services requested by the user.

23. A gateway server for interposition between a wireless local area network and a protected network, the server comprising:
   (a) a receiver for receiving, from a user of a mobile device via a wireless access point, an indication of a request to access another server on the protected network;
   (b) an authentication subsystem for passively monitoring an authentication process in which the user makes a request to authenticate to the another server and the another server authenticates the user;
   (c) a role assignor in communication with the receiver and the authentication subsystem for assigning a role to the authenticated user based on the another server with which the user authenticated; and
   (d) an access controller in communication with the assignor for providing access to the protected network based on the assigned role.

24. The gateway server of claim 23 further comprising a second gateway server for interposition between the wireless network and the protected network to provide a fail-over configuration, and wherein the second gateway server receives the request if the first gateway server fails.

25. The gateway server of claim 23, wherein the request to access the protected network received by the receiver comprises an identifier and authentication information.

26. The gateway server of claim 25, wherein the identifier comprises at least one of a username, an email address, and an unique name.

27. The gateway server of claim 25, wherein the authentication information comprises at least one of a PIN, password, digital certificate, encryption key, and digital code.

28. The gateway server of claim 23, wherein the request to access the protected network received by the receiver comprises a request to access network resources.

29. The gateway server of claim 28, wherein the external authentication server authenticates the user as a user that previously authenticated without requiring communication of authentication information.

30. The gateway server of claim 23, wherein the external authentication server used comprises a RADIUS server.

31. The gateway server of claim 23, wherein the external authentication server used comprises a LDAP server.

32. The gateway server of claim 23, wherein the external authentication server used comprises a NTLM server.

33. The gateway server of claim 32, wherein the use of the external authentication server is transparent to the user.

34. The gateway server of claim 23, wherein user authentication with a Windows 2000 or NT server.

35. The gateway server of claim 23, wherein the communication between the mobile device and the gateway server substantially is according to one of the Point-to-Point Protocol (PPTP) or the IPSec protocol.

36. The gateway server of claim 23 further comprising a role definer for defining the role for the user.

37. The gateway server of claim 36, wherein the role definer further comprises: (i) specifying network resources available; (ii) specifying a degree of access to the protected network; and (iii) specifying an available connection bandwidth.

38. The gateway server of claim 37, wherein the role definer further comprises: (iv) specifying a tunneling protocol.

39. The gateway server of claim 37, wherein the role definer further comprises: (v) specifying an inherited role.

40. The gateway server of claim 23 further comprising a replicator for replicating a plurality of second gateway servers for interposition between the wireless network and the protected network from the gateway server.

41. The gateway server of claim 23 further comprising a secure web browser page.

42. The gateway server of clam 23 further comprising a detector for detecting unauthorized access points by monitoring network traffic and signals.

43. The gateway server of claim 23 wherein the assigned role comprises one or more policies.

44. The gateway server of claim 43 wherein the policies describe one or more services requested by the user.

45. A gateway server for interposition between a wireless network and a protected network, the server comprising:
   (a) means for receiving, from a user of a mobile device via a wireless access point, an indication of a request to access another server on the protected network;
   (b) means for passively monitoring an authentication process between the user and the another server in which the user makes a request to authenticate to another server and the another server authenticates the user;
   (c) means for assigning a role to the authenticated user based on the another server with which the user authenticated without authenticating the user to the gateway server; and
   (d) means for providing access to the protected network based on the assigned role.

46. A mesh network of gateway servers comprising: a plurality of gateway servers each in communication with a wireless local area network and a protected network, each of the plurality of gateway servers in communication with each other to facilitate hand-off of a mobile device from one of the plurality of gateway servers to another of the plurality of gateway servers, and, wherein each of the plurality of gateway servers comprises:
   (i) a receiver for receiving, from a user of a mobile device via a wireless access point, an indication of a request to access another server on the protected network;

(ii) an authentication subsystem for passively monitoring an authentication process in which the user makes a request to authenticate to the another server and the another server authenticates the user;

(iii) a role assignor in communication with the receiver and the authentication subsystem for assigning a role to the authenticated user based on the another server with which the user authenticated; and (iv) an access controller in communication with the assignor for providing access to the protected network based on the assigned role.

47. The network of claim 46, wherein each of the plurality of gateway servers provides a fail-over configuration and configuration replication.

48. The network of claim 46, wherein at least two of the plurality of gateway are in communication with substantially different types networks.

49. The network of claim 48, wherein at least one of the plurality of gateway servers supports a cellular network.

50. The network of claim 48, wherein at least one of the plurality of gateway servers are in communication with radio-frequency based network.

51. The network of claim 46 wherein the assigned role comprises one or more policies.

52. The network of claim 51 wherein the policies describe one or more services requested by the user.

* * * * *